Sept. 18, 1923.

M. FEYBUSCH ET AL 1,468,146

BOX MAKING MACHINE

Filed Oct. 14, 1920    8 Sheets-Sheet 1

Inventors
MARTIN FEYBUSCH
SIGURD SEVERSON
by Breser Schrunk
Attorneys

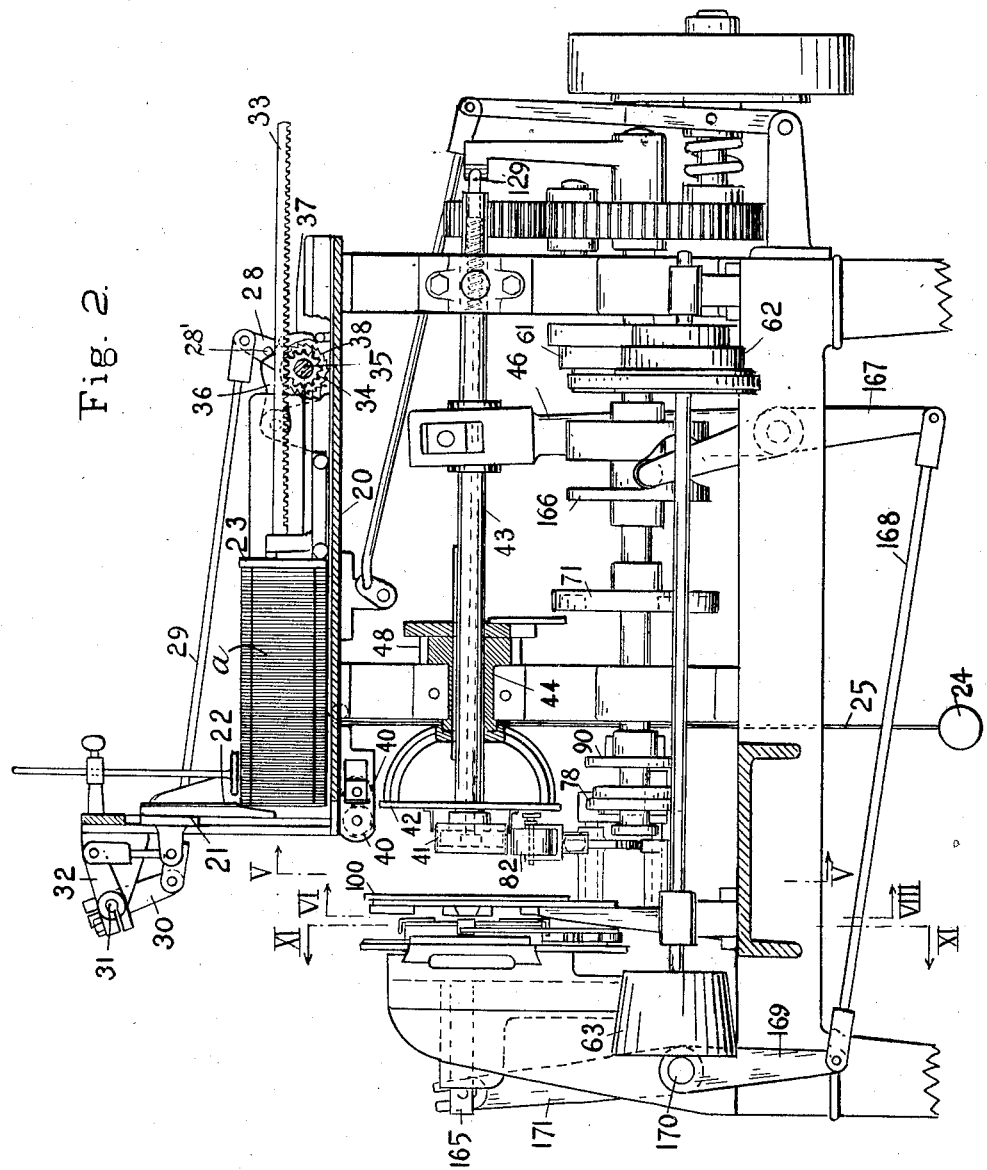

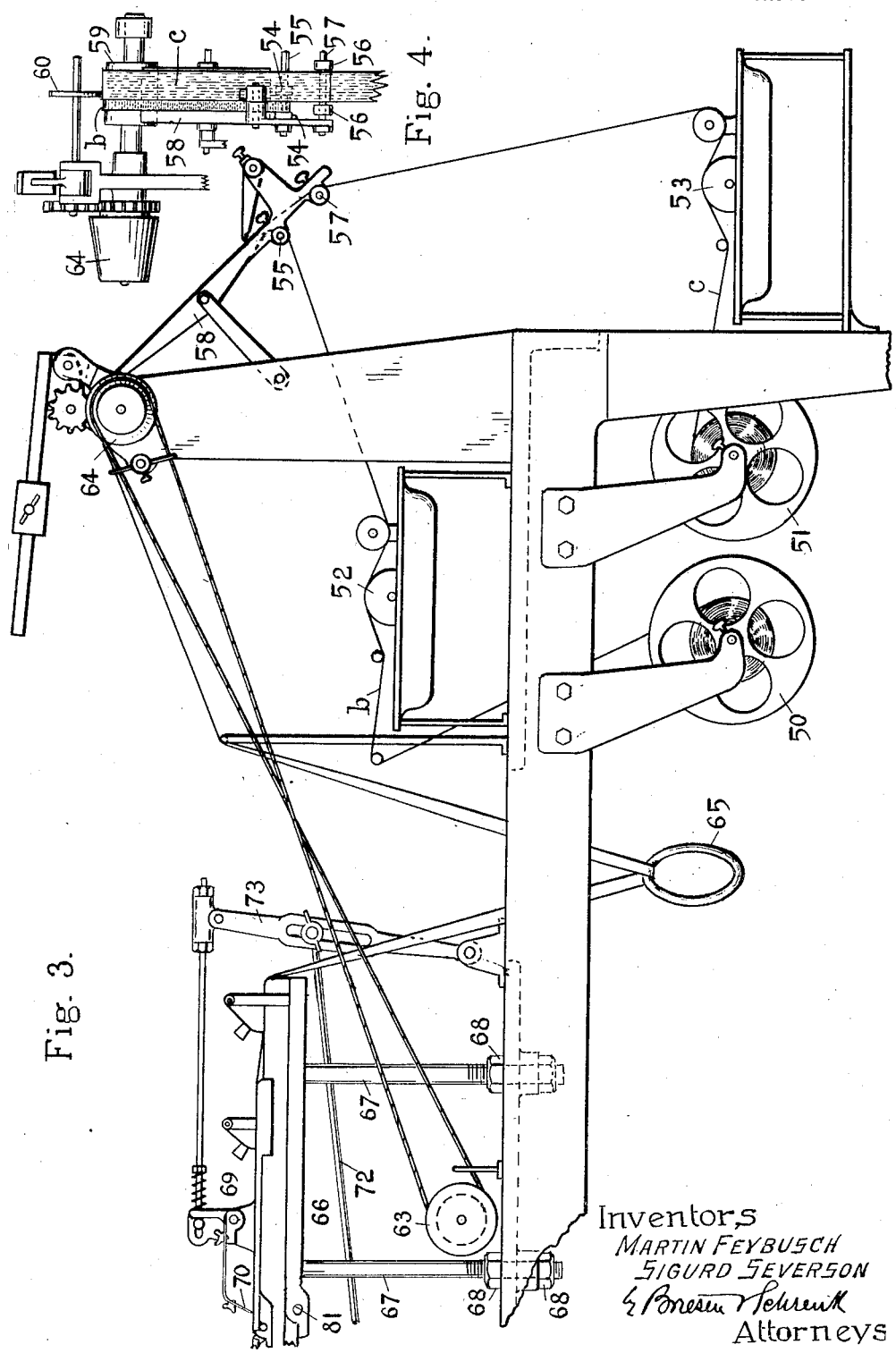

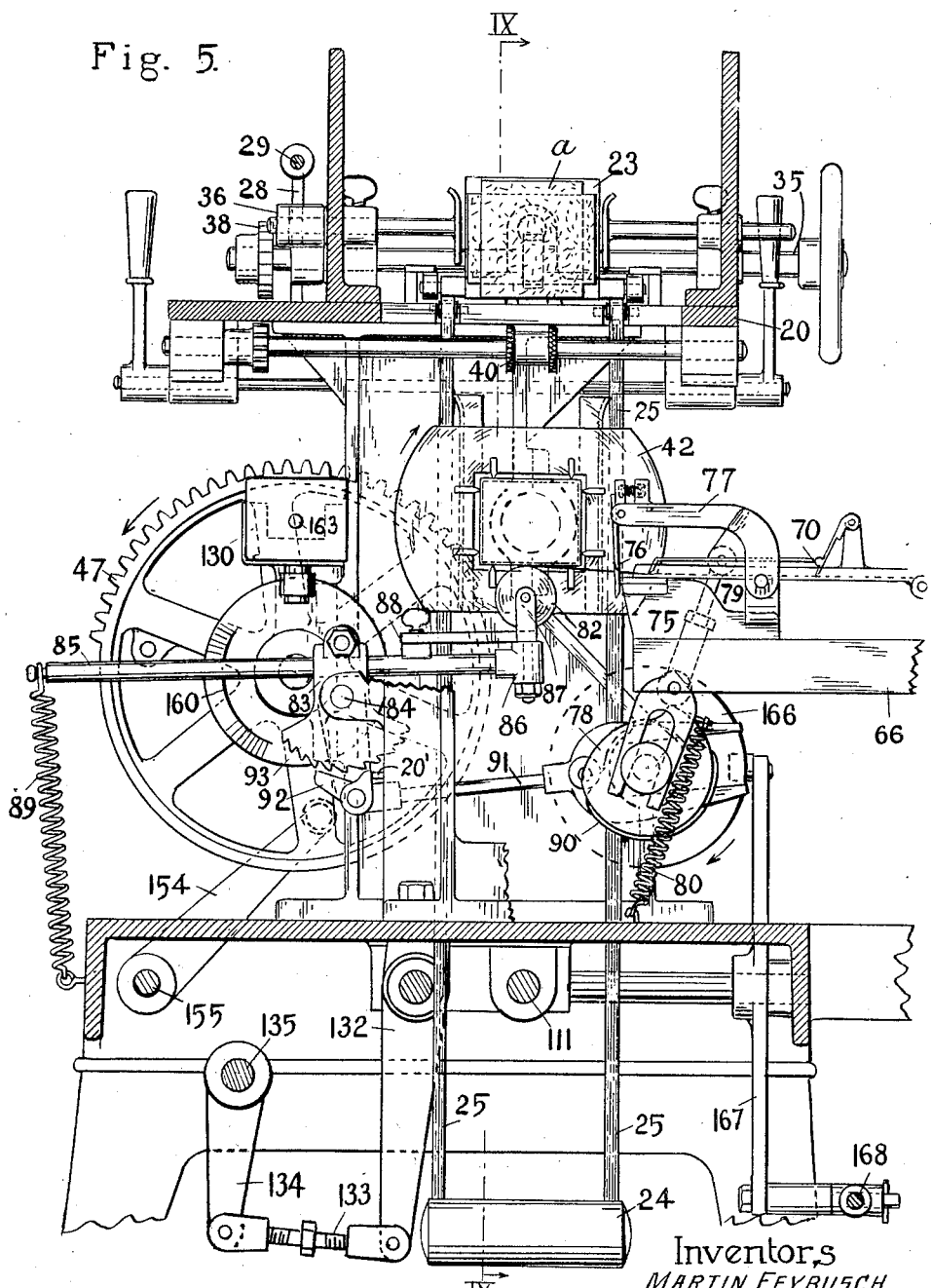

Sept. 18, 1923.

M. FEYBUSCH ET AL 1,468,146

BOX MAKING MACHINE

Filed Oct. 14, 1920

Inventors
MARTIN FEYBUSCH
SIGURD SEVERSON
by Bresen Schrenk
Attorneys

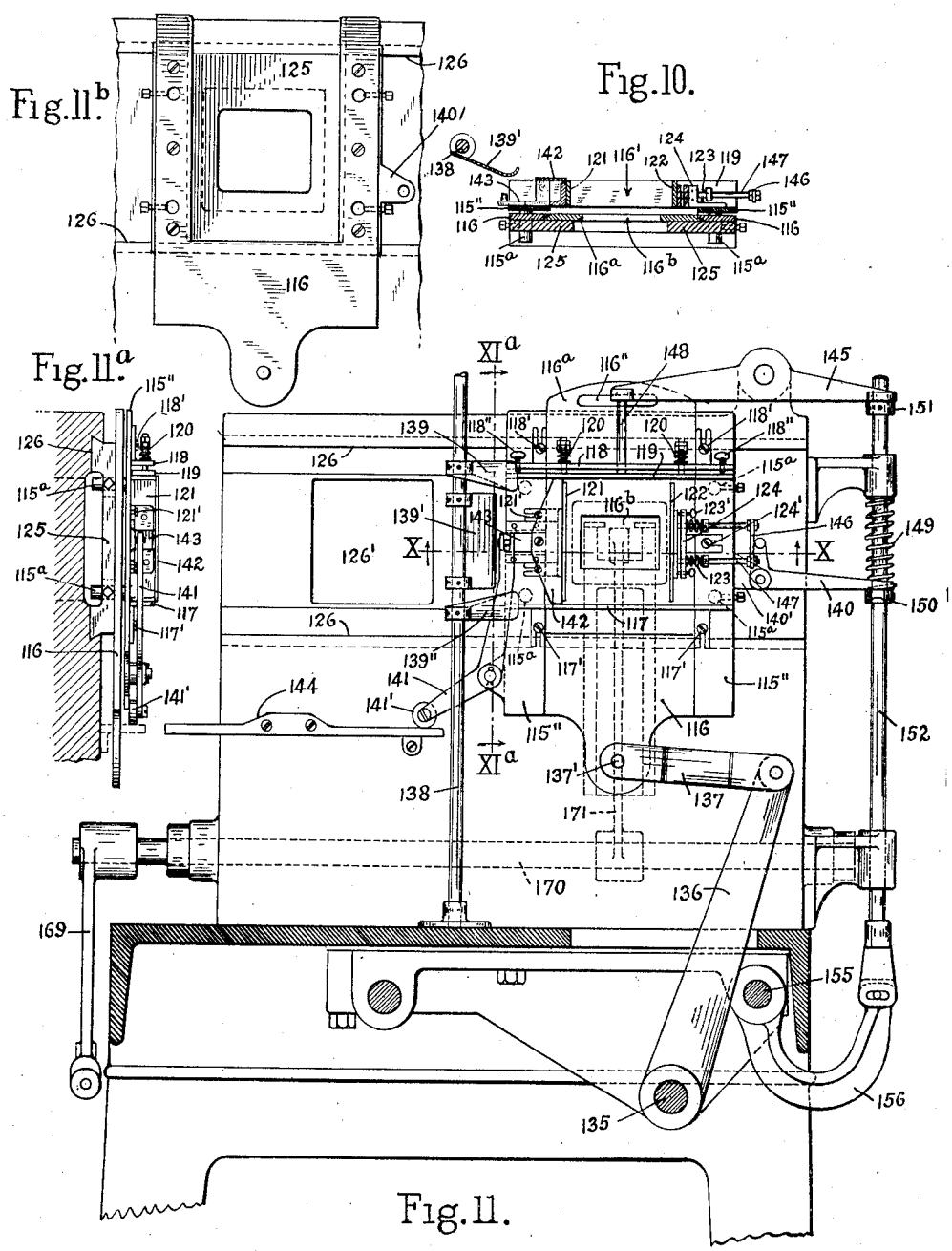

Sept. 18, 1923.   M. FEYBUSCH ET AL   1,468,146
BOX MAKING MACHINE
Filed Oct. 14, 1920   8 Sheets-Sheet 7

Inventors
MARTIN FEYBUSCH
SIGURD SEVERSON
by Bresen Schrenk
Attorneys

Sept. 18, 1923.

M. FEYBUSCH ET AL 1,468,146

BOX MAKING MACHINE

Filed Oct. 14, 1920    8 Sheets-Sheet 8

Inventors
MARTIN FEYBUSCH
SIGURD SEVERSON
by Bresee Schrenk
Attorneys

Patented Sept. 18, 1923.

1,468,146

UNITED STATES PATENT OFFICE.

MARTIN FEYBUSCH, OF NEW YORK, AND SIGURD SEVERSON, OF BROOKLYN, NEW YORK, ASSIGNORS TO NEW JERSEY MACHINE CORPORATION, OF HOBOKEN, NEW JERSEY, A CORPORATION OF NEW JERSEY.

BOX-MAKING MACHINE.

Application filed October 14, 1920. Serial No. 417,014.

*To all whom it may concern:*

Be it known that we, MARTIN FEYBUSCH, a citizen of the United States, and resident of the borough of Manhattan, city, county, and State of New York, and SIGURD SEVERSON, a citizen of the United States, and resident of Brooklyn, State of New York, have invented certain new and useful Improvements in Box-Making Machines, of which the following is a specification.

This invention relates to mechanism for making boxes of pasteboard such as are commonly used for cigarettes, candy, shoes, and a wide variety of merchandise which requires a rectangular box wherein the side with the greatest area is usually the bottom and in which the top is open. Such a machine is also adapted to the manufacture of the covers of such boxes and neck pieces therefor. Many features of this invention are also applicable in the manufacture of other types of boxes.

In the embodiment shown box-blanks of pasteboard are provided which have been cut and scored so as to define the bottom and four sides, (see Fig. 5), and the paper which is to be wrapped about the four sides is provided in a roll, or if desired, in two rolls, one of which may be the usual cover strip and the other a narrow strip of manilla paper added for its tensile strength under the side which wraps the top edge of the box, or, for the purpose of giving the box a distinctive appearance, the two strips may be of different colors, one of which is laid along the lower portion of the box sides and the other of which is laid along the upper portion, the two slightly overlapping, or one strip may be wide enough to cover the sides and the other be a narrow strip laid on as a stripe. Further objects of these improvements are to increase the efficiency and speed of operation, to render the product more uniform, and to afford a type of machine which can be easily altered when it is desired to change the machine to make a different size of box, and only comparatively inexpensive parts are required to be substituted.

In the accompanying eight sheets of drawings which form a part of this application, Figure 1 is a side elevation of a box-making machine which embodies this invention.

Fig. 2 is a side elevation from the opposite side omitting the mechanism for supplying the binding strips.

Fig. 3 is a side elevation of the mechanism for supplying the binding strips.

Fig. 4 is an end elevation of the portion of the machine for supplying the binding strips by which the strips are guided and superimposed.

Fig. 5 is a section through the machine on the line V—V of Figs. 1 and 2, showing the box-forming and wrapping mechanisms, and the intermittent feed and cut-off mechanisms for the strips.

Fig. 10 is a section of the detachable matrix frame on the line X—X of Fig. 11, looked at from below.

Fig. 11 is a section through the machine on the line XI—XI of Figs. 1 and 2, showing the mechanism for the top edge folding.

Fig. 11$^a$ is a vertical section through the machine on the line XI$^a$—XI$^a$ of Fig. 11.

Fig. 11$^b$ is a detail view of the slide-plate 125 and U-shaped plate 116, forming part of the assembly shown in Fig. 11.

Figure 12:
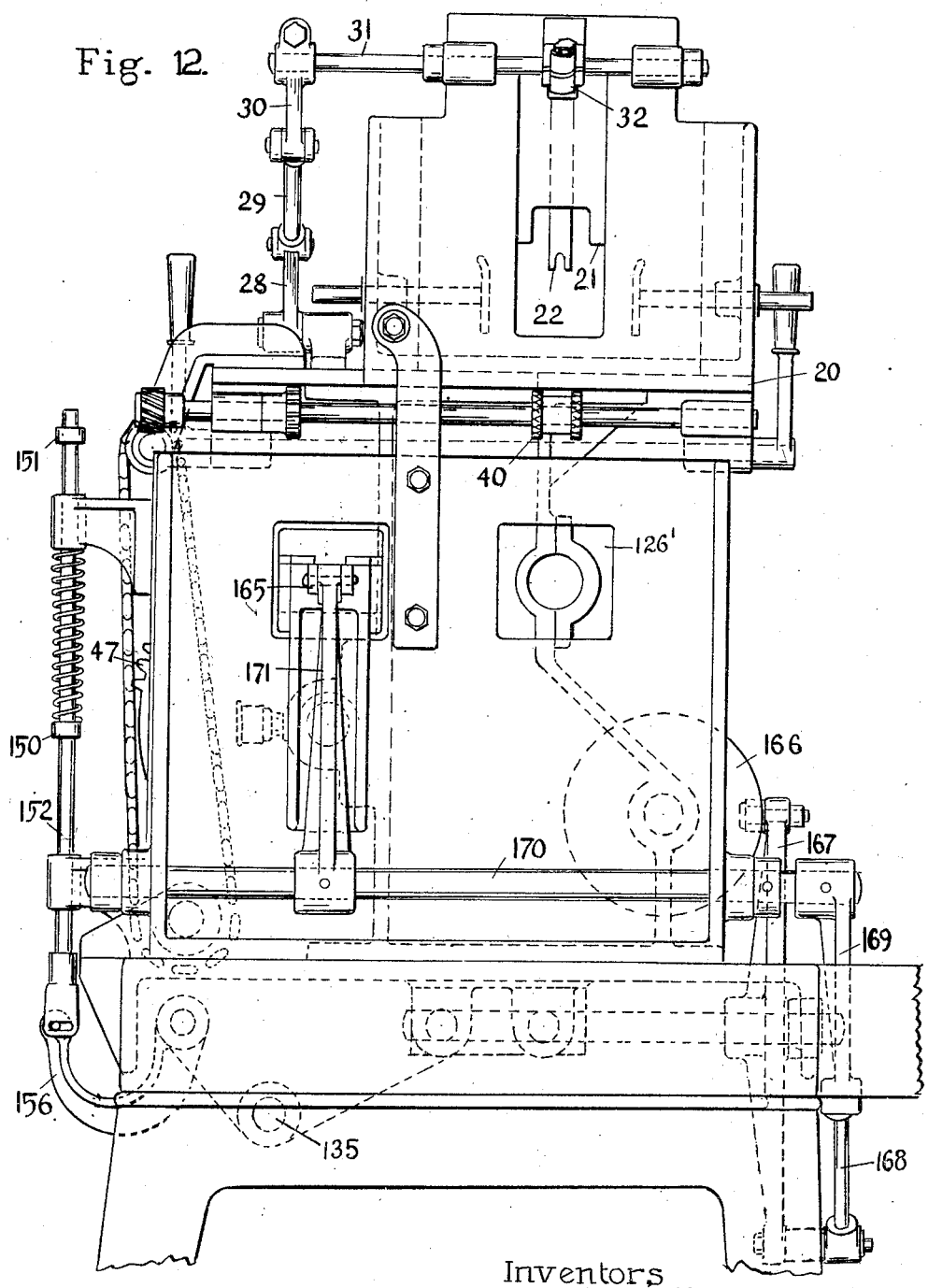

Fig. 12 is a front view of the machine showing the ejector for the finished box.

Figure 1:
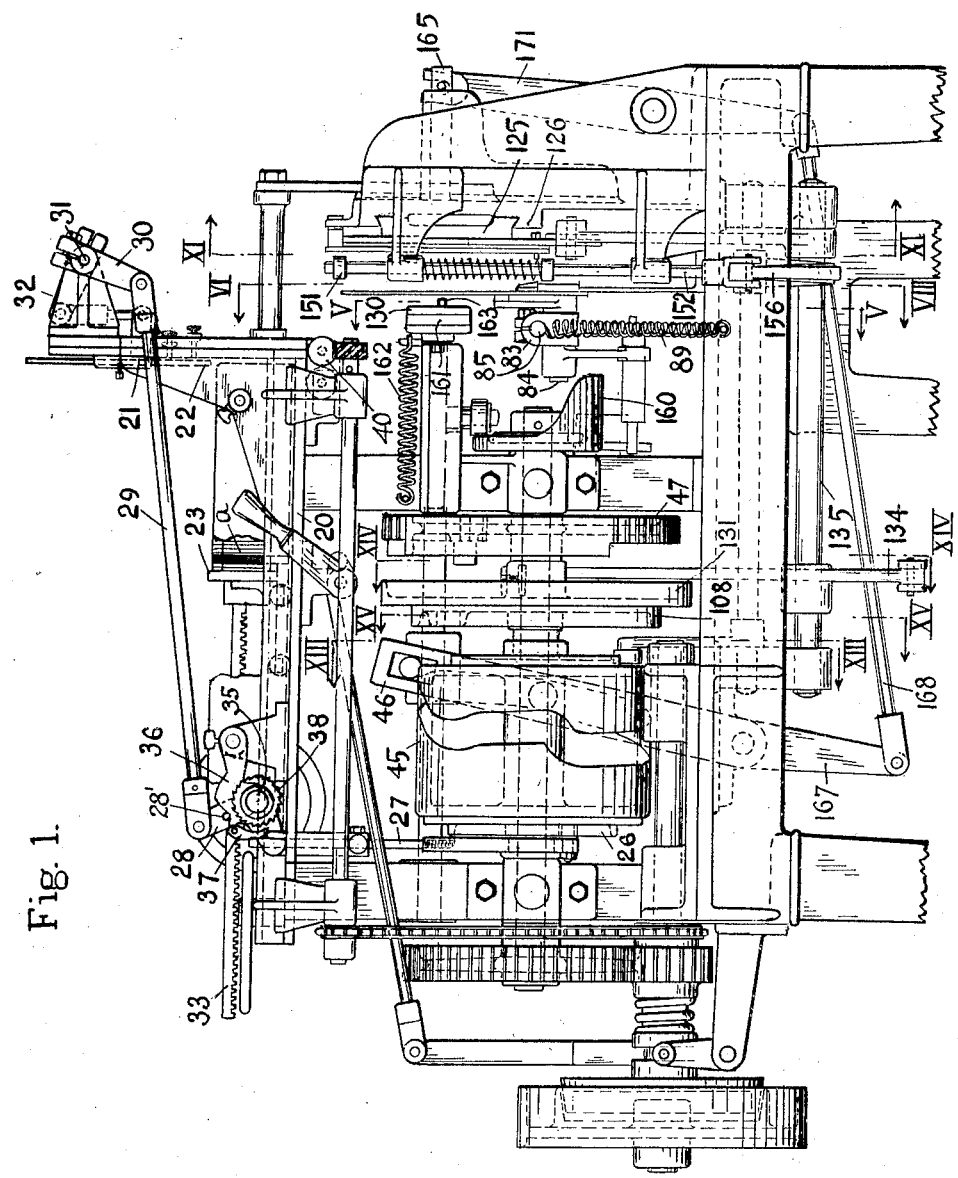
Figure 6:
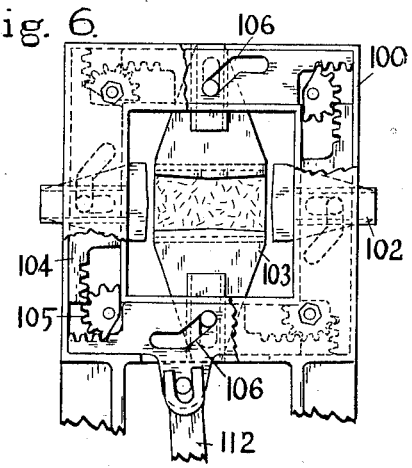
Figs. 6, 7 and 8 are posititonal views in a section through the machine on the line VI—VIII of Figs. 1 and 2, showing the mechanism for the bottom edge folding.
Figure 7:
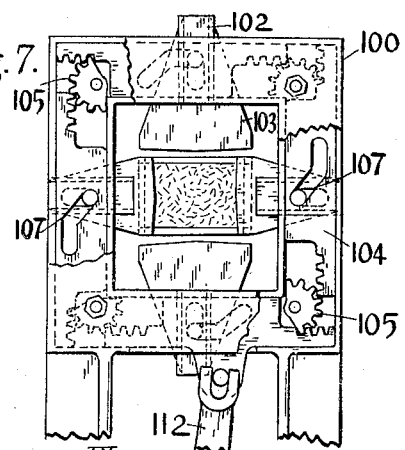
Figure 8:
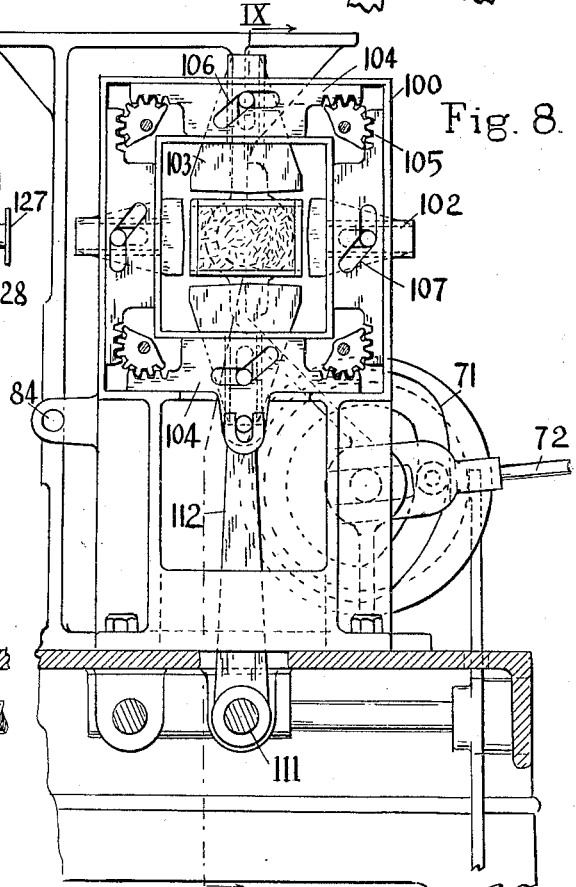
Figure 9:
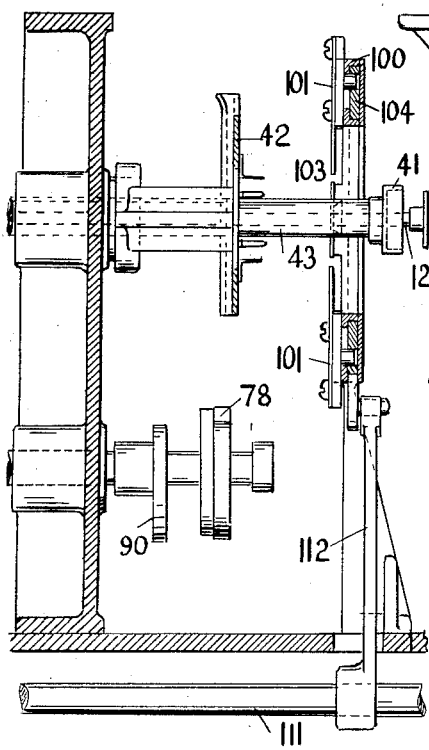
Fig. 9 is a vertical section through the same on the line IX—IX of Figs. 5 and 8.
Figure 13:
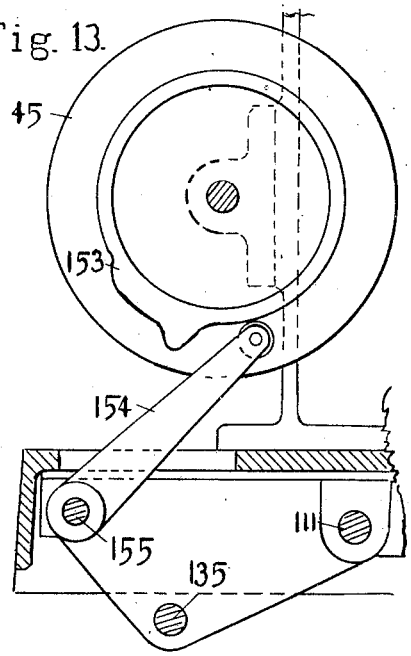

Fig. 13 is a section on the line XIII—XIII of Fig. 1 showing the cam for the top-edge folding.

Figure 14:
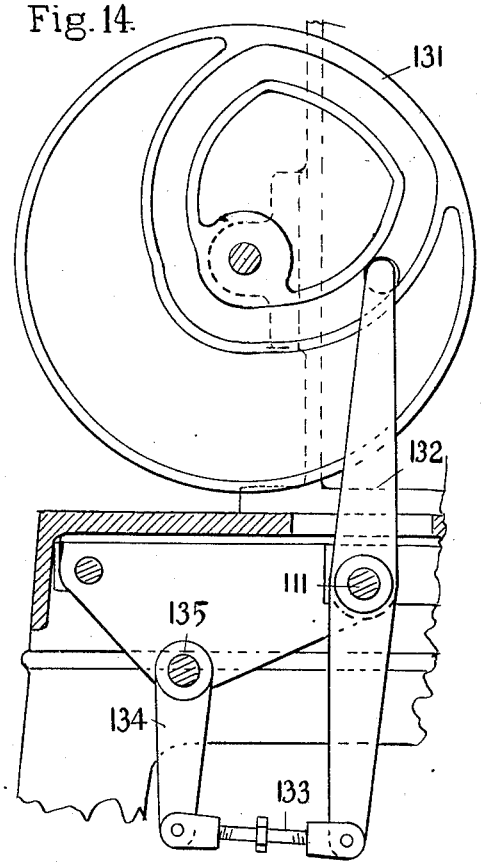

Fig. 14 is a section on the line XIV—XIV of Fig. 1 showing the cam for operating the transversely movable carrier.

Figure 15:
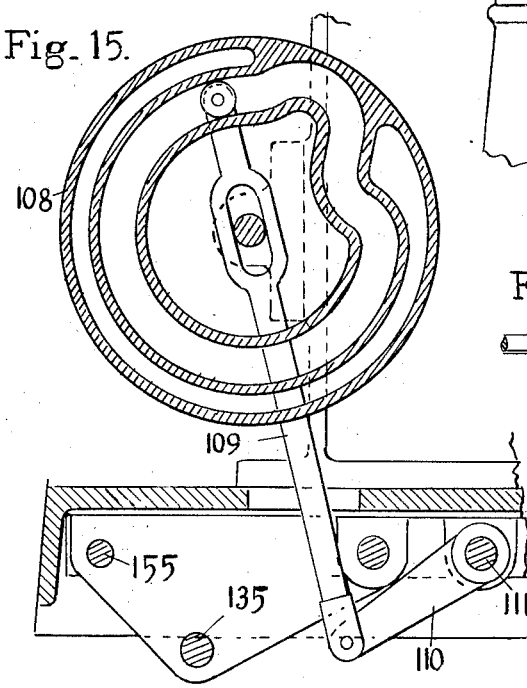

Fig. 15 is a section on the line XV—XV of Fig. 1 showing the cam for operating the bottom-edge folders.

Figure 16:
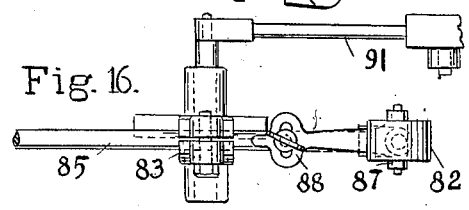

Fig. 16 is a top view of the wrapping roller and its support.

Figure 17:
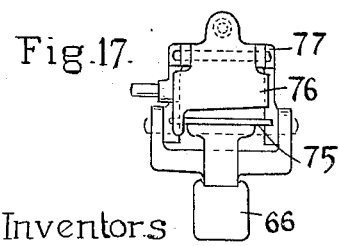

Fig. 17 is a front view of the cut-off mechanism.

The following is a brief statement of the general nature of the operation performed by the machine illustrated in the accompanying drawings:

The blanks, of the usual form referred to above, are fed one by one from a stack or quantity, to a position between a core and a former. By a relative movement of said core and former, the four sides of the blank are turned to a position perpendicular to the bottom. Then a strip of material (either single or duplex, as referred to above) is wrapped around the sides of the formed box, with the gummed face of the strip engaging said sides and pressed against them by a roller. The edges of said strip project beyond those of the box sides. Then the lower edges of the strip are folded and pressed against the bottom of the box and thereupon the upper projecting portions are folded inward till they are about perpendicular to the sides of the box. Thereafter the box is brought into operative relation to a plunger which, while the box is held in a matrix, enters the box to fold the upper edges of the gummed strip against the inner surfaces of the box sides. The plunger having been withdrawn from the matrix, the box is discharged by means of an ejector.

The various recurring movements of the machine are derived from cams on two camshafts which are geared together by equal gears so as to revolve at the same speed.

A blank-supporting table 20 carries a quantity of pasteboard blanks $a$ between a slide 21 provided with an ejector finger 22 and a movable plate 23. The plate is drawn against the blanks by a weight 24 which is connected to the said plate by flexible tapes 25, 25 (Figs. 2 and 5). A cam 26 through a rod 27, bell-crank 28, rod 29, arm 30, rock shaft 31 and arm 32 operates the slide 21 and ejector finger 22. The movable plate 23 is attached to the end of a rack bar 33 in engagement with a pinion 34 on a shaft 35. When the bell-crank lever 28 is operated to cause the ejector finger 22 to feed a blank, a pin 28' on the bell-crank first presses down on a lever 36 which carries a pawl 37, and the pawl is engaged with a ratchet wheel 38 on the shaft 35. The engagement of the pawl causes the movable plate to be drawn back slightly and the pressure against the blanks relieved while the ejector finger is feeding. The front blank is displaced by the finger sufficiently to engage it with continuously driven feed rolls 40, 40 by which it is passed between a rotative core 41 and a forming frame 42. The core is carried by a hollow shaft 43 and the frame is carried by a sleeve 44 through which the shaft passes and to which it is splined. A cam 45 (Fig. 1.) through a lever 46 controls the endwise movement of the shaft. The core is advanced through the frame and the blank formed up. The core and frame are then rotated by a mutilated gear 47 which meshes with a pinion 48 (Fig. 2) on the sleeve to effect the wrapping of the binding strip. At the time the blanks are fed between the former 42 and the core 41 the latter is to the right of the former and not to the left, as in Fig. 2, so that the shaft 43 is not in the way of the descending blank.

When it is desired to wrap the box with a composite binding strip, one of the strips for the composite strip is carried on a reel 50 and the other on a reel 51 (Fig. 3). The first strip $b$ is led over a gumming roll 52 and the second strip $c$ over a gumming roll 53. Thence the first strip is led to guides consisting of a pair of collars 54, 54 which can be set where desired on a pin 55, and the second strip $c$ is led to guides consisting of a pair of collars 56, 56 which can be set where desired on a pin 57 (Fig. 4). The strips are then superimposed in part and led along a table 58 over which they are drawn continuously between a broad feed roll 59 against which the ungummed faces of the strips bear and a narrow feed roll 60 which bears against the gummed side. These rolls are continuously driven through stepped pulleys 61 and 62 (Fig. 2) and coned pulleys 63 and 64, (Figs. 3 and 4) by which the length of paper required for each box is accurately adjusted and continuous movement over the guming rolls maintained to insure an even coating of gum. From the continuous feeding mechanism the combined strip is formed into a hanging loop which is kept stretched to prevent kinking by a weight in the form of a ring 65 (Fig. 3) through which the strip is passed. A twist is given to the strip in passing to and from the ring so that the ring will bear against the ungummed side of the strip and the strip is led to a feeding table 66 with the gummed side uppermost.

The table 66 is supported from the base of the machine through posts 67, 67 which are threaded and have nuts 68, 68 thereon by which the height of the table is conveniently adjusted. The table carries an intermittent feeding mechanism consisting of a plate 69 and fingers 70, 70. The feed is operated from a cam 71 (Fig. 2) through a rod 72 and lever 73 (Fig. 3). The table also carries a cut-off device consisting of a blade 75 at the end of the table and a blade 76 which is carried by an arm 77 (Figs. 5 and 17). The cut-off blade is lifted by a cam 78 acting through a rod 79 and cuts by the action of a spring 80. The feeding table is jointed at 81 (Fig. 3) so that the end adjacent to the core may be folded back to afford more convenient access to the mechanism in front of it, since the intermittent feed and the cut-off device are both carried by the table and the same adjusting means adjusts the heights of both.

The strip is engaged between the under side of the core 41 and a wrapping roller 82 (Fig. 2). This roller is supported from an arm 83 hinged to swing about a pin 84 parallel to the axis of the rotative core. The arm supports a rod 85 (Fig. 1) which is clamped to the arm in any desired position and the rod through a swivel support 86 at right angles carries a fork 87 (Figs. 5 and 16) for the roller 82. This swivel support has an arm 88 with a transverse slot at the end through which a screw clamps it to the rod and accurate setting is conveniently made. The roller 82 is thereby supported in such a manner as to be universally adjustable with respect to the arm and can be set so that the strip will wrap straight and evenly around the box. The roller is pressed against the rotative core by a spring 89.

While the blank is being formed and the strip is being fed by the intermittent feed, the roller 82 (Fig. 5) is drawn down away from the core 41 by a cam 90 acting through a rod 91 and pawl 92 which engages with a ratchet segment 93 on the arm 83. At other times the pawl is retracted by contact with a pin 20' on the frame so as to leave the arm free to vibrate and the roller to follow the contour of the rotative core. By reason of the ratchet connection the roller is drawn down away from the core at the proper time and by substantially the same amount by the cam, regardless of the size of box which the machine is set up to make.

The box having been wrapped by the gummed strip and while still on the rotative core is carried by further projection of the core to a folding frame 100 with straight guides 101, 101 (Fig. 9) on the four sides thereof. Four slides 102, 102 are mounted in the guides, and four bottom-edge folders 103, 103 are carried by the slides. Four sliding cam-bars 104, 104 are mounted on the frame and are joined for concurrent endwise movement through gear segments 105, 105. They have cams 106, 106 for operating the upper and lower folders when the cam-bar movements are in one direction thus folding down, on two opposite sides of the box, the bottom edge of the wrapped strip; and cams 107, 107 for operating the side folders when the cam-bar movements are in the other direction and thus folding down, on the other two sides of the box, the bottom edge of the wrapped strip. In the middle position of the cam-bars all of the folders are retracted. The cam-bars are operated from a cam 108 (Fig. 15) through a rod 109, arm 110, rock shaft 111 and arm 112 (Figs. 6 to 9).

After the bottom edge folders have operated, the core is further advanced, and the box is deposited in a frame or opening 116' (Fig. 10) formed by four strips or walls 117, 119, 121 and 122 (Fig. 11). These walls are mounted in a manner hereinafter described, on two strips 115" which in turn are held adjustably by pins 115ª in a slide-plate 125 provided with an opening shown in dotted lines in Fig. 11 and in full lines in Fig. 11ᵇ, and arranged to slide in horizontal guides 126. To this slide-plate is fixed a U-shaped plate 116 whose lower portion only appears in Fig. 11, but which is shown completely in Fig. 11ª and Fig. 11ᵇ. An interchangeable plate 116ª, having an opening 116ᵇ and a handhold opening 116", is slidably mounted in plate 116. Such plate 116ª serves as a back pressed plate against which the box is pressed by the core, and assists in holding the box in proper position when in the frame.

The lower wall 117 is normally stationary relatively to the strips 115", but adjustable up and down, as by the screw and slot devices indicated at 117'. The strips 115" carry also a member 118 adjustable up and down, as indicated at 118', but normally stationary with reference to said strips. Between the lower wall 117 and said member 118 is located an upper wall 119 parallel to the wall 117 and drawn toward the member 118 by springs 120, to a normal position depending on the adjustment of screws 118" screwing into the member 118 and engaging the wall 119 with their ends. Between the walls 117, 119 are fitted the two parallel upright walls 121, 122 which are exchangeable to fit different adjustments of said walls 117, 119 from each other. The wall 121 is normally stationary relatively to the strips 115", but may be adjusted horizontally, for instance, by screw and slot devices indicated at 121'. The other upright wall 122 is held by springs 123 against the ends of screws 123' screwed into a member 124 normally stationary relatively to the strips 115" but adjustable to the right or left, for instance, by means such as indicated at 124'. The walls 117, 119, 121, 122 are adapted to engage the four walls of the box which is inserted between them by the automatic means shown in Fig. 9.

The openings in slide 125 and plate 116ª are at first opposite the core 41 in registry with the opening 126' shown at the left of Fig. 11, and at this time the box is inserted between the walls 117, 119, 121, 122, with the gummed paper strip projecting beyond the edges of the box walls. The spring-pressed connection of the walls 119, 122 enables them to adjust themselves to slight irregularities in the size of the box, of the covering paper, etc.

When the core returns after depositing the box in the frame 116', a foot 127 (Fig. 9) holds the box in such frame while the core is being withdrawn. The foot is on the end of a rod 128 which passes through the shaft on which the rotatable core is carried. At the moment when the core is retracted the foot is prevented from following by an arm 129 (Fig. 2) which is opposite the other end of the rod. When the arm 129 is swung aside, a coiled spring 128' (Fig. 2) will withdraw the foot 127 against the core 41.

The transversely movable slide plate 125 is shifted while the box is held in the frame 116' from a position opposite the rotatable core 41 to a position opposite a plunger 130 for turning in the top edges of the wrapped strip (Figs. 1 and 5). The carrier constituted by said plate 125, frame 116', and associated parts is operated by a cam 131 (Fig. 14) through a lever 132, link 133, arm 134, rock shaft 135, arm 136 and link 137 (Fig. 11). The link 137 is connected at one end by a pin 137' with the U-shaped plate 116.

At a point between said original position of the frame 116' and its second position shown in Fig. 11, is arranged a folder mechanism comprising a stationary upright support 138 and folders 139, 139', 139'', each adjustable thereon vertically, but normally stationary, although the middle folder 139' might be made movable, if desired. As the slide-plate 125 moves toward the right from a position opposite the opening 126', the said three folders will engage the projecting gummed paper strip adjacent to the upper, lower, and right-hand walls 119, 117 and 122 respectively, folding the strip until it lies in a plane substantially perpendicular to the box sides. During this movement of the slide-plate 125 toward the right, the paper strip adjacent to the left-hand wall 121 is folded inwardly in the same manner by the action of a folder 142 secured to a slide 143 movable horizontally on the strips 115'', through the medium of a bell-crank lever 141 fulcrumed on the strips 115'' and having a roller 141' engaging a stationary cam 144, to cause the folder 142 to move at the proper moment during the travel of the silde-plate 125. Of course, the folder 139' is so arranged as to clear the path of the folder 142. When the position shown in Fig. 11 is attained, the top edges of the paper strip having been turned to a position perpendicular to the sides of the box, as described, by the folders 139, 139', 139'' and 142, the plunger 130 is advanced by a cam 160 against the pressure of spring 162 (Figs. 1 and 5) to turn in the edge of the wrapped strip. Then the arm 156 on the rock shaft 155, operated by cam 153 and arm 154, (Fig. 13), lifts the vertically sliding rod 152 (urged by the spring 149) and by means of the collars 150, 151 thereon swings the levers 140, 145 respectively, on their pivots. The lever 140 is fulcrumed on an extension piece 140' on the slide-plate 125, but the fulcrum of lever 145 is stationary. The lever 140 engages a plate 146 connected with the wall 122 by horizontal rods 147, and the lever 145 engages a rod 148 secured to the upper wall 119. Thus pressure is applied to the finished box while plunger 130 is still within the same by moving the walls 119, 122 toward the walls 117, 121 respectively.

Thereupon the plunger 130 is withdrawn by the spring 162, the cam 160 having revolved so as to permit this operation, and the box is prevented from following by a spring pressed pin 163 (Fig. 1). The advantages of the special folding mechanism illustrated by Figs. 10, 11, 11$^a$ and 11$^b$ are numerous and important. It enables the machine to handle a variety of box sizes, with a substitution or exchange of but few parts of the mahcine. Further, the mechanism will accommodate itself to different types and thickness of materials, as it is customary to cover boxes of the same size in different ways, for instance, with various thicknesses or various layers of paper or reinforcing material. Furthermore, the whole die is adjustable in a horizontal direction by means of the pins 115$^a$ so as to adapt it to different depths of boxes. A further advantage of this die is that the pressure necessary to press on the so-called "turn-in" block of the box is applied from the outside, which allows the "turn-in" block to be made of a piece of wood or like suitable material, instead of using mechanism for expansion, from the inside, as in some prior machines. When pressure is applied from the inside, by means of such expansion mechanism, the coating material of the paper adheres to the walls of the die and impairs the continuity of the operation unless such mechanism is very accurately adjusted. The necessity of such accurate adjustment is obviated by the use of the new type of "turn-in" die illustrated herein.

Opposing the plunger is an ejector 165 (Figs. 1, 2, 5 and 12) which is operated from a cam 166 through a lever 167, connecting rod 168, arm 169, rock-shaft 170, and arm 171. The ejector discharges the box.

With but slight experience, the operator will be able to use the machine for boxes of any size within the range of the machine, without making any delicate adjustments or substituting more than a very few and very inexpensive exchangeable parts. The "turn-in" is rubbed tightly against the flange of the box, which gives a better effect than that obtained by turning the box over sheet folders. When using stiff paper or turning over reinforcing material, the paper has a tendency to spring back before the plunger turns the paper over completely, thus causing a certain amount of waste by producing a certain proportion of boxes which must be discarded as imperfect. By rubbing the "turn-in" against the edge of the box, the paper will stay properly folded, and the plunger 130 can act without any recoil of the paper.

We claim:

1. In a mechanism for supplying a composite binding strip for boxes, means for carrying two paper strips, independent means for gumming each of the strips, means for guiding and superimposing the strips with their corresponding edges out of coincidence, a table for supporting the combined strips after leaving the guiding means, and feeding mechanism, movable lengthwise of said table, for drawing the combined strips over the table.

2. In a mechanism for supplying a binding strip for boxes, a roll for gumming the strip, a continuous feeding mechanism for drawing the strip over the gumming roll, an intermittent feeding mechanism for supplying the strip to boxes, and a weight for keeping tight a hanging loop in the strip between the continuous feeding mechanism and the intermittent feeding mechanism.

3. In a mechanism for supplying a binding strip for boxes, a roll for gumming the strip, a continuous feeding mechanism for drawing the strip over the gumming roll, an intermittent feeding mechanism for supplying the strip to boxes, and a weight in the form of a ring, for taking up the slack in the strip between the continuous feeding mechanism and the intermittent feeding mechanism.

4. In a box machine, a rotative core, a feeding table for a binding strip said table being adjustable relatively to said core, an intermittent feeding mechanism cooperating with the feeding table and a cut-off mechanism cooperating with the feeding table.

5. In a box making machine, a rotative core, a wrapping roller, an arm hinged to swing about an axis parallel to the axis of the rotative core, a universally adjustable support for the roller on the arm, and means for holding the roller against the rotative core.

6. In a box making machine, a rotative core, a wrapping roller, a fork in which the roller is supported, an arm hinged to swing about an axis parallel to the axis of the rotative core, a rod adjustably supported by the arm, and an adjustable swivel support between the rod and the fork for the roller whereby the roller is universally adjustable with respect to the arm.

7. In a box making machine, a rotative core, an arm hinged to swing about an axis parallel to the axis of the rotative core, a wrapping roller carried thereby, means for holding the roller against the rotative core, and means for retracting the arm including a pawl and rachet connection.

8. In a box making machine, a folding frame with straight guides on the four sides thereof, slides mounted in the guides, bottom-edge folders carried by the slides, cam bars mounted on the frame with cams for operating two opposing folders toward each other when each cam bar is moved in one direction and for operating the two other opposing folders toward each other when each cam bar is moved in the other direction, and means for moving the cam bars each in one direction and then in the other direction.

9. In a box machine, a core mounted to rotate about a horizontal axis, a vertically-adjustable feeding table for a binding strip, an intermittent feeding mechanism co-operating with said feeding table, and a cut-off mechanism likewise co-operating with said table.

10. In a box machine, a core for holding a box-blank, a feeding table extending transversely to the axis of said core and an intermittent feeding mechanism arranged to reciprocate lengthwise of said table and to move a binding strip for said box blank lengthwise of said table.

11. In a box machine, a core, means for applying a binding strip to a box-blank held on said core, and a frame adapted to receive said box blank, said frame having members movable inwardly to press the binding strip against the box blank.

12. In a box machine, a core, means for applying a binding strip to a box-blank held on said core, and a frame adapted to receive said box-blank, said frame having elastically mounted members to press the binding strip against the box-blank.

13. In a box machine, a core, means for applying a binding strip to a box-blank held on said core, and a frame adapted to receive said box-blank, said frame having slides movable toward and from the axis of the core and adapted to press the binding strip against the box-blank.

14. In a box machine, a core, means for applying a binding strip to a box-blank held on said core, and a frame adapted to receive said box-blank, said frame having stationary members and presser members movable toward and from said stationary members.

15. In a box machine, a core, means for applying a binding strip to a box-blank held on said core, and a frame adapted to receive said box-blank, said frame having a stationary member and a presser member parallel to said stationary member and movable toward and from the same.

16. In a box machine, a core, means for applying a binding strip to a box-blank held on said core, and a frame adapted to receive said box-blank, said frame having stationary members arranged at an angle to each other, and presser members parallel to the respective stationary members and movable toward and from the same.

17. In a box machine, a core, means for applying a binding strip to a box-blank held on said core, and a frame adapted to receive said box-blank, said frame having a stationary member and a presser member movable toward and from said stationary member, the latter being adjustable in the direction in which the other member moves.

18. In a box machine, a core, means for applying a binding strip to a box-blank held on said core, and a frame adapted to receive said box-blank and adjustable lengthwise of the core's axis to correspond to box-blanks of different depth.

19. In a box machine, a core, means for applying a binding strip to a box-blank held on said core, and a frame adapted to receive said box-blank and having a separately removable back plate to engage the bottom of the box, said plate being exchangeable to fit different types of boxes.

20. In a box machine, a core, means for applying a binding strip to a box-blank held on said core, and a frame adapted to receive said box-blank from said core and comprising an apertured plate into the aperture of which the sides of the box are adapted to enter, and an apertured back plate for engaging the bottom of the box, means for effecting successive registry of said frame with the core and with the ejector respectively and ejector mechanism operating through the aperture of the back plate.

21. In a box machine, a core, means for applying a binding strip to a box-blank held on said core, and a frame having, on the side facing the core, an opening adapted to receive the box-blank and a shoulder to engage the bottom of said blank, said frame also having an opening on the side opposite to the core, means for effecting successive registry of said frame with the core and with the ejector respectively and ejector mechanism operating through the second-named opening.

22. In a box machine, a frame for holding a box-blank with a binding strip thereon, means for folding the projecting portion of the binding strip while the blank is held in said frame, a core arranged on one side of said frame to transfer the box-blank to said frame, means for effecting successive registry of said frame with the core and with the ejector respectively and an ejector located on the opposite side of the frame to remove the box-blank from the frame.

23. In a box machine, a core adapted to hold a box-blank, an ejector, a frame located between said core and said ejector, and means for effecting relative movement of the core, frame and ejector to first transfer a box-blank from the core to the frame, in one direction, while such core and frame are in registry, and then effect registry of said frame with the ejector and eject said box-blank from the frame, in the opposite direction.

24. In a box machine, a reciprocating core adapted to hold a box-blank with a projecting binding strip, a frame adapted to hold such box-blank and movable transversely of the path of said core, to receive the box-blank from the core and then carry such blank out of registry with the core, reciprocating ejector arranged to expel the blank from said frame after the latter has been shifted out of registry with the core, and means mounted on a stationary support adjacent to the path of the frame, to sweep the projecting portion of the binding strip and fold it into a position parallel to the bottom of the box-blank as the latter is carried from registry with the core into registry with the ejector.

25. In a box machine, a reciprocating core adapted to hold a box-blank with a projecting binding strip, a frame adapted to hold such box-blank and movable transversely of the path of the core, means for folding the projecting portion of the binding strip, a presser carried by said frame movably and adapted to press the binding strip against the wall of the box, an actuating mechanism arranged to come into operative relation to said presser when the frame has been moved out of registry with said core, and an ejector which is in registry with said frame when the presser is in operative relation to said actuating mechanism.

26. In a box machine, means for wrapping a binding strip on a box-blank and for folding the projecting portion of the strip so that such portion will project inwardly across the open end of the blank, a plunger movable into said open end to press such projecting portion against the inner face of the box-blank, and an ejector movable in line with said plunger, against the closed end of the blank.

27. In a box machine, a frame adapted to receive a box-blank, a core arranged to enter and hold a box-blank, means for effecting relative motion of said core and frame to transfer the blank from the core to the frame, and a foot movable with the core and connected therewith loosely, and means for holding said foot stationary at the time the core is being withdrawn from the box-blank, to prevent such blank from following the core.

28. In a box machine, a frame adapted to receive a box-blank, a core arranged to enter and hold a box-blank and to engage the inner faces of the side walls of the blank, means for effecting relative motion of said core and frame to transfer the blank from the core to the frame, a foot movable with the core and adapted to engage the inner surface of the bottom of the box-blank, and means to keep said foot in contact with the blank as the core is being withdrawn therefrom to prevent such blank from following the core during such withdrawal.

29. In a box machine, a core adapted to hold a box-blank with a binding strip projecting both at the open and at the closed end of the blank, a frame adapted to receive said blank from said core and having movable pressing means to engage said binding strip, folding mechanism located adjacent to said core and adapted to fold the binding strip against the closed end of the blank, means for effecting relative movement of the core and frame longitudinally of the core and past said folding mechanism to fold the binding strip against the closed end of the blank before such blank is received in said frame, a plunger adapted to enter the open end of the blank while the latter is held in said frame, means for effecting relative movement of the frame, core, and plunger transversely of the core to cause said frame to register first with the core and then with the plunger, means for folding the binding strip portion projecting at the open end of the box, into a position across such open end, during such transverse relative movement, means for effecting relative movement of the frame and plunger longitudinally of the plunger at the time they are in registry, to fold the binding strip into the box-blank, and for actuating the said pressing means while the plunger is in the blank, and an ejector for removing the blank from said frame.

In testimony whereof we have hereunto set our hands.

MARTIN FEYBUSCH.
SIGURD SEVERSON.